(12) United States Patent
Pickard (10) Patent No.: US 8,841,834 B2
(45) Date of Patent: Sep. 23, 2014

(54) SOLID STATE LIGHTING SYSTEMS USING OLEDS

(75) Inventor: Paul Kenneth Pickard, Morrisville, NC (US)

(73) Assignee: Cree, Inc., Durham, NC (US)

( * ) Notice: Subject to any disclaimer, the term of this patent is extended or adjusted under 35 U.S.C. 154(b) by 91 days.

(21) Appl. No.: 13/050,995

(22) Filed: Mar. 18, 2011

(65) Prior Publication Data
US 2012/0235560 A1 Sep. 20, 2012

(51) Int. Cl.
| H01L 51/50 | (2006.01) |
| H01L 33/50 | (2010.01) |
| F21V 29/00 | (2006.01) |
| F21S 8/02 | (2006.01) |
| F21Y 113/00 | (2006.01) |
| F21Y 105/00 | (2006.01) |
| F21Y 101/02 | (2006.01) |

(52) U.S. Cl.
CPC ....... *F21V 29/2212* (2013.01); *F21Y 2113/005* (2013.01); *F21V 29/004* (2013.01); *F21S 8/02* (2013.01); *Y02B 20/36* (2013.01); *F21Y 2105/008* (2013.01); *F21Y 2101/02* (2013.01)
USPC ........... 313/504; 313/512; 313/501; 362/228; 362/231

(58) Field of Classification Search
USPC ............................ 313/498–512; 362/228, 231
See application file for complete search history.

(56) References Cited

U.S. PATENT DOCUMENTS

| 5,583,349 | A * | 12/1996 | Norman et al. | 257/88 |
| 7,052,152 | B2 * | 5/2006 | Harbers et al. | 362/30 |
| 7,213,940 | B1 | 5/2007 | Van De Ven et al. | |
| 7,365,485 | B2 * | 4/2008 | Fukasawa et al. | 313/502 |
| 7,768,192 | B2 | 8/2010 | Van De Ven et al. | |
| 8,264,142 | B2 * | 9/2012 | Amelung et al. | 313/506 |
| 2008/0094004 | A1 * | 4/2008 | Ackermann | 315/294 |
| 2008/0143242 | A1 * | 6/2008 | De Graaf et al. | 313/498 |
| 2008/0278957 | A1 | 11/2008 | Pickard et al. | |
| 2009/0103296 | A1 | 4/2009 | Harbers et al. | |
| 2009/0303705 | A1 * | 12/2009 | Waumans et al. | 362/228 |

(Continued)

FOREIGN PATENT DOCUMENTS

| KR | 20100125135 A | 11/2010 |
| WO | 2010032203 A1 | 3/2010 |

OTHER PUBLICATIONS

Cree, Inc., International Application No. PCT/US2012/027946, International Search Report and Written Opinion, May 29, 2012.

(Continued)

*Primary Examiner* — Mariceli Santiago
(74) *Attorney, Agent, or Firm* — Steven B. Phillips; Moore & Van Allen PLLC (57) ABSTRACT

Solid state lighting systems using organic LEDs (OLEDs) are disclosed. Embodiments of the present invention provide a solid state lighting system and a luminaire wherein substantially white light is generated by a combination of an organic LED (OLED) and another type of solid state emitter. The other type of solid state emitter may be, for example, a conventional LED made from inorganic materials. The OLED is positioned so that substantially white light is emitted from the lighting system by mixing light from the two types of sources. In some embodiments, a dichroic mirror can also be used at the opening of a mixing chamber to prevent absorption of light from the OLED back into the mixing chamber or conventional LEDs within the mixing chamber.

14 Claims, 5 Drawing Sheets

(56) References Cited

U.S. PATENT DOCUMENTS

2010/0254129 A1    10/2010  Le Toquin et al.
2010/0328926 A1*   12/2010  Hoelen et al. .................... 362/84
2012/0280631 A1*   11/2012  Burrows et al. ............... 315/192

OTHER PUBLICATIONS

U.S. Department of Energy, Bright Tomorrow Lighting Competition (L Prize™), Jun. 26, 2009, Revision 1, 18 pages.

* cited by examiner

SOLID STATE LIGHTING SYSTEMS USING OLEDS

BACKGROUND

Light emitting diode (LED) lighting systems are becoming more prevalent as replacements for existing lighting systems. LEDs are an example of solid state lighting (SSL) and have advantages over traditional lighting solutions such as incandescent and fluorescent lighting because they use less energy, are more durable, operate longer, can be combined in red-blue-green arrays that can be controlled to deliver virtually any color light, and contain no lead or mercury. In many applications, one or more LED dies (or chips) are mounted within an LED package or on an LED module, which may make up part of a lighting unit, lamp, "light bulb" or more simply a "bulb," which includes one or more power supplies to power the LEDs. An LED bulb may be made with a form factor that allows it to replace a standard threaded incandescent bulb, or any of various types of fluorescent lamps. LEDs can also be used in place of florescent lights as backlights for displays.

LEDs can be made of various materials, including silicon carbide and sapphire. Organic materials can also be used to make LEDs. A so-called "organic LED" (OLED) is made by placing a series of organic thin films between two conductors. When electrical current is applied, it passes from a negatively charged (cathode) film layer to a positively charged (anode) film layer, and the energy from the electrical current stimulates organic material, which in turn emits light visible through an outermost layer of the OLED structure.

Color reproduction can be an important characteristic of any type of artificial lighting, including LED lighting. For lamps, color reproduction is typically measured using the color rendering index (CRI). The CRI is a relative measurement of how the color rendition of an illumination system compares to that of a particular known source of light. In more practical terms, the CRI is a relative measure of the shift in surface color of an object when lit by a particular lamp. The CRI equals 100 if the color coordinates of a set of test surfaces being illuminated by the lamp are the same as the coordinates of the same test surfaces being irradiated by the known source. CRI is a standard for a given type light or light from a specified type of source with a given color temperature. A higher CRI is desirable for any type of replacement lamp.

SUMMARY

Embodiments of the present invention provide a solid state lighting system and/or a luminaire, wherein substantially white light can be generated by a combining light from an organic LED (OLED) and light from another type of solid state emitter. The other type of solid state emitter may be, for example, a conventional LED made from inorganic materials. In some embodiments, the OLED and other emitters are arranged to be spaced apart from each other by a mixing chamber of the luminaire to minimize color hot spots that sometimes occur when LED emitters of two different colors are used in close proximity within a luminaire, especially a large-area fixture.

In at least some embodiments, a lighting system includes at least one solid state emitter configured to emit light of a first color when energized, and an organic light emitting diode (OLED) configured to emit light of a second color when energized. In some embodiments, the OLED is positioned so that substantially white light is emitted from the lighting system when the at least one solid state emitter and the OLED are energized to emit the first and second colors of light. The OLED and the other emitter could also be chosen so that some other color of light is emitted if desired. In some embodiments, the OLED is disposed on a substantially transparent substrate. The substantially transparent substrate can act as a lens at the opening of a mixing chamber.

In some embodiments, the solid state emitter emitting the first color of light is a conventional (inorganic) LED packaged with a phosphor to emit blue-shifted yellow (BSY) light as the first color of light and the OLED is operable to emit red light as the second color of light. The BSY and red light combine to form substantially white light, which can have a color rendering index (CRI) of at least 90. In some embodiments, a diffuser is placed adjacent to the substantially transparent substrate.

In some embodiments, the solid state emitters that emit the first color of light are LEDs packaged without a phosphor, and a remote phosphor is used. The remote phosphor can be applied to or disposed near the substrate of the OLED. As an example, the LEDs that emit the first color of light might emit blue light, and the remote phosphor could be used in combination with these LEDs to produce BSY light that mixes with red light from the OLED at the opening of the mixing chamber. In some such embodiments, a dichroic mirror can also be used at the opening of the mixing chamber, for example, a red dichroic mirror. The mirror can be placed between the substrate and the remote phosphor. The mirror prevents absorption of the red light by the mixing chamber, and devices or structures within the mixing chamber.

In some embodiments, the lighting system based on the two types of emitters is used to make a luminaire by providing the mixing chamber with the plurality of emitters to emit light of the first wavelength, whether these are BSY emitters using a local phosphor, blue emitters, or some other color emitting LEDs designed to work with a remote phosphor. The OLED on the transparent substrate is installed at the opening through which light exits the mixing chamber and ultimately the luminaire. In example embodiments, the mixing chamber is connected to a heat sink and power connections are provided for all the emitters. A finished luminaire may include a power supply or may be designed to be powered by a DC power system.

In some embodiments, the light from the blue-emitting LEDs in a luminaire has a dominant wavelength from 435 to 490 nm, the light from the OLED has a dominant wavelength from 600 to 640 nm and the light from the phosphor has a dominant wavelength from 540 to 585 nm. In some embodiments, the light from the blue-emitting LEDs in a luminaire has a dominant wavelength from 440 to 480 nm, the light from the OLED has a dominant wavelength from 605 to 630 nm and the light from the phosphor has a dominant wavelength from 560 to 580 nm.

BRIEF DESCRIPTION OF THE DRAWINGS

FIG. 4 shows an end view and a perspective view, in FIGS. 4A and 4B, respectively, of an example LED luminaire making use of a lighting system as shown in any one of the previous drawings.

DETAILED DESCRIPTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

Illustrative embodiments of the present invention show a solid state lighting system deployed in a troffer style light fixture or luminaire. Such a luminaire might be used as a solid state replacement for a standard fluorescent light fixture, and/or might be of a form factor to be placed in the space normally occupied by a drop ceiling tile in an office environment. These embodiments are presented as fully-enabled, illustrative examples only. An embodiment of the invention can be developed based on this disclosure herein for any type of directional solid-state lighting. For example, an embodiment of the invention could be used to create an OLED-enabled solid-state replacement for a standard R30 incandescent bulb that is commonly used in residential down-lighting. It cannot be over-emphasized that the troffer style fixture shown herein is only an example.

Figure 1:
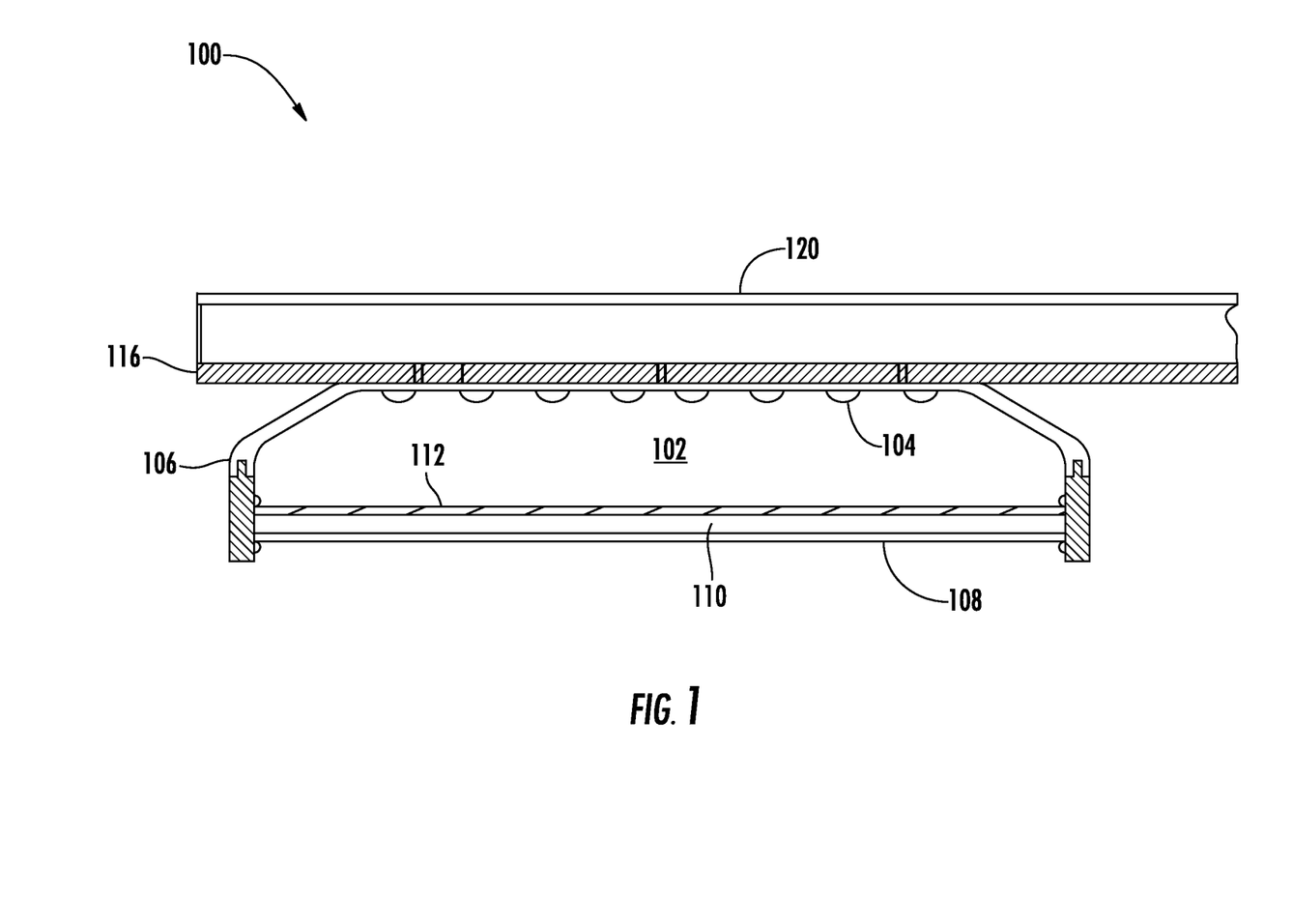
FIG. 1 is a cross-sectional illustration of a lighting system according to at least some embodiments of the present invention.

FIG. 1 illustrates a lighting system according to an example embodiment of the invention. The lighting system 100 of FIG. 1 includes a mixing chamber 102 and a plurality of solid state emitters 104 disposed within the mixing chamber. The solid state emitters in this example embodiment includes LED chips packaged with a phosphor. Each package in this example emits light of a particular color or wavelength, which can be mixed with light of another color or wavelength to create white light, as will be discussed in more detail below, although a system could be designed to emit some other color of light if desired.

Still referring to FIG. 1, mixing chamber 102 is formed by a housing 106, sometimes referred to as a "light basket." Disposed at the opening to the mixing chamber 102 is an OLED 108 on a substrate 110, which in at least some embodiments is substantially transparent. In this particular embodiment, a diffuser 112 is installed adjacent to the substrate 110. LED packages 104 are mounted on a circuit board 116, which includes traces (not shown) to provide power to the LEDs in the packages. Wires (not shown) also pass through the walls of light basket 106 to provide power to OLED 108. Although not part of the lighting system itself, heat sink 120 in this embodiment provides a mechanical mounting surface for circuit board 116 as well as cooling for the lighting system.

It should be noted that what is meant by "substantially transparent" when referring to the OLED substrate 110 is not necessarily that the transparency of the substrate is as high as optical glass. Such transparency is not required of the substrate in order for the lighting system to function as intended. A majority of the light from solid state emitters 104 that impinges on substrate 110 should pass through the substrate to mix with light from the OLED, but some absorption, distortion, and/or reflectance is acceptable.

As previously mentioned, LEDs can be combined in multi-color arrays that can be controlled to deliver virtually any color light. In the example embodiment herein the solid state emitters inside the light basket and the OLED emit a first and second color of light, which combine to form substantially white light. Various color combinations could be used to obtain what could generally be referred to as substantially white light. In the particular embodiment of FIG. 1, blue LEDs are included in the solid state emitter packages 104 of FIG. 1, and a phosphor is deposited on the encapsulating lens for each LED package at such a thickness so that some of the light from the LED goes through the phosphor, while other light is absorbed and the wavelength is converted by the phosphor. Thus, each LED inside the light basket is packaged to form a blue-shifted yellow (BSY) LED device. The OLED at the opening to the mixing chamber emits red or orange (red/orange) light. Thus, substantially white light can be produced when these two colors are combined. This type of lighting system may be referred to as a BSY+R solid state lighting system. The combination of the spatial separation of the two color light sources and the distributed nature of the OLED light reduces or eliminates color hot spots that might otherwise occur where discrete LEDs are used for both color light sources. Thermal management of the system is made easier by not having the two color light sources packed together on one circuit board.

Figure 2:
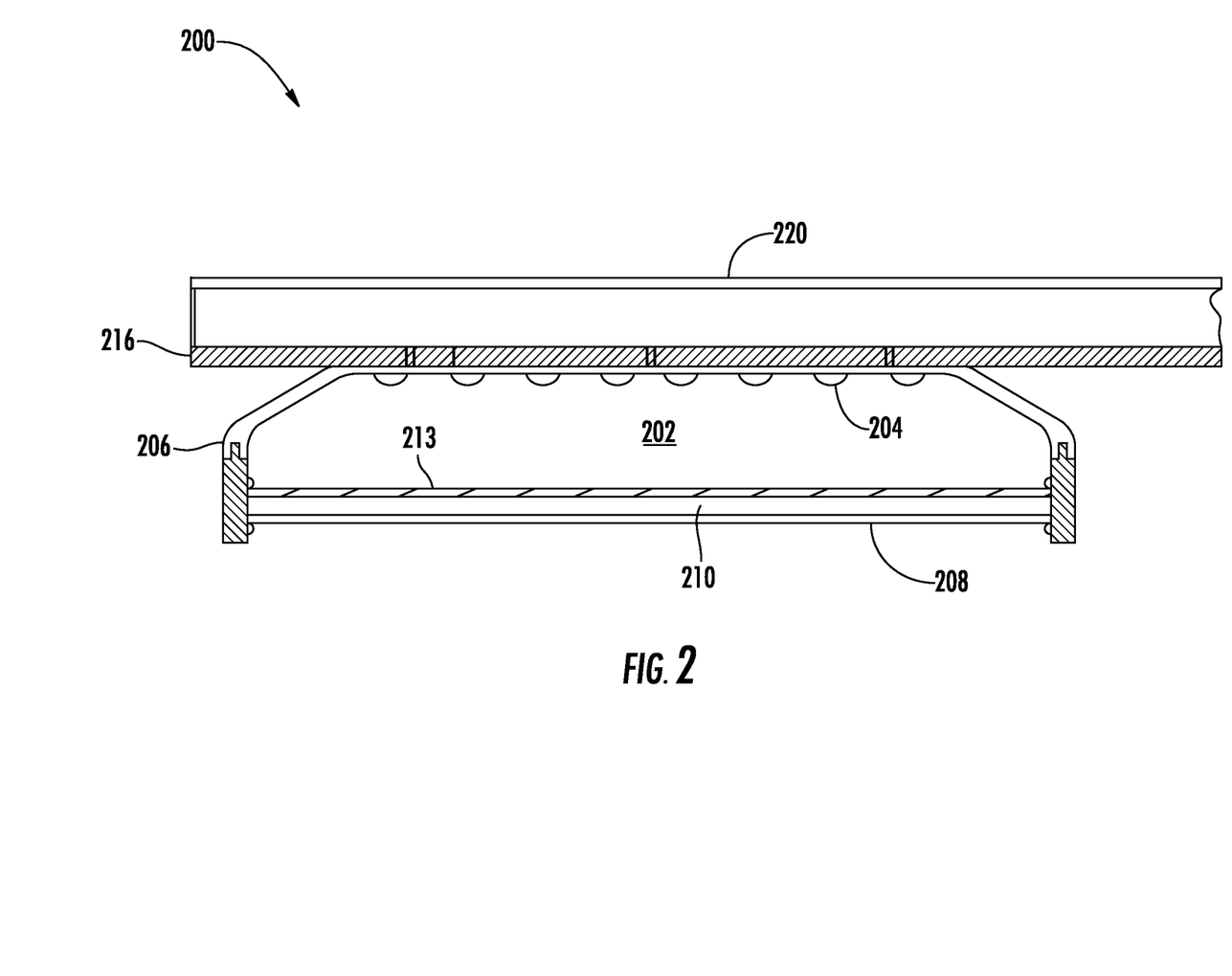
FIG. 2 is a cross-sectional illustration of a lighting system according to other embodiments of the present invention.

FIG. 2 illustrates a lighting system according to another example embodiment of the invention. The lighting system 200 of FIG. 2 includes a mixing chamber 202 and a plurality of solid state emitters 204 disposed within the mixing chamber. The solid state emitters in this example embodiment include LED chips packaged without a phosphor. Each emitter package 204 in this example includes a blue-emitting LED similar to those previously described. Mixing chamber 202 is formed by a housing 206. Disposed again at the opening to the mixing chamber 202 is an OLED 208 on a substantially transparent substrate 210. In this particular embodiment, phosphor 213 is applied to or placed adjacent to substrate 210. Thus, lighting system 200 is again a BSY+R lighting system, however, the blue shifted yellow light is created using remote phosphor 213 rather than a phosphor packaged with the LEDs in the light basket.

Still referring to FIG. 2, LED packages 204 are mounted on a circuit board 216, which includes traces (not shown) to provide power to the blue LEDs. Wires (not shown) also pass through the walls of light basket 206 to provide power to OLED 208. Heat sink 220 in this embodiment provides a mechanical mounting surface for circuit board 216 as well as cooling.

Figure 3:
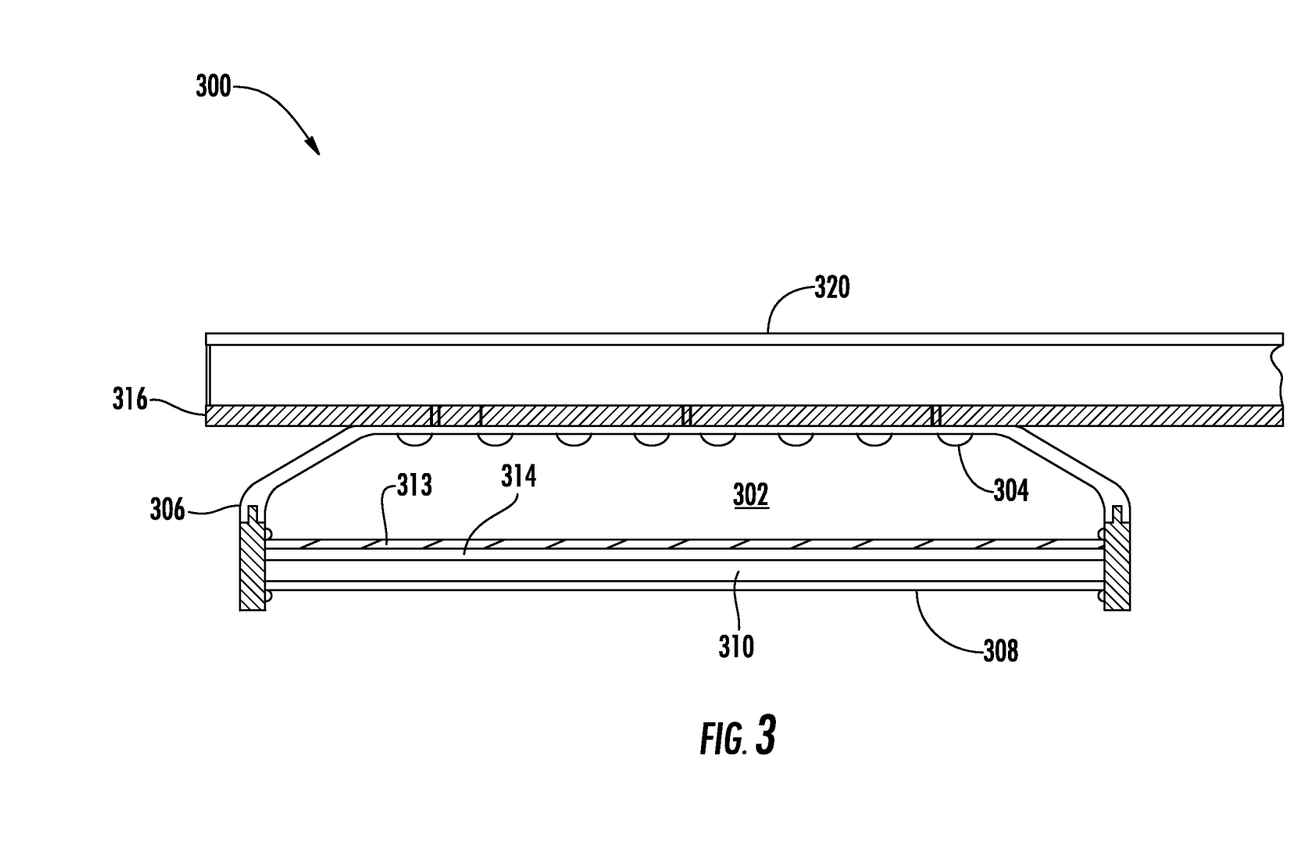
FIG. 3 is a cross-sectional illustration of a lighting system according to additional embodiments of the present invention.

FIG. 3 illustrates a lighting system according to another example embodiment of the invention. The lighting system 300 of FIG. 3 includes a mixing chamber 302 and a plurality of solid state emitters 304 disposed within the mixing chamber. The solid state emitters in this example embodiment again consist of LED chips packaged without a phosphor. Each emitter package 304 in this example again includes a blue-emitting LED. Mixing chamber 302 is formed by a housing 306. Disposed again at the opening to the mixing chamber 302 is an OLED 308 on a substantially transparent substrate 310. In this embodiment, phosphor 313 is placed near substrate 310, however, dichroic mirror 314 is disposed between phosphor 313 and substrate 310. Thus, lighting system 300 is again a BSY+R lighting system with the blue shifted yellow light created using remote phosphor 313.

The dichroic mirror, 314 in FIG. 3 can improve the efficiency of the lighting system by preventing light from the OLED from entering the mixing chamber and being absorbed or disbursed by the chamber walls, the LED's in the chamber, or other structures. In a BSY+R system like the example embodiments shown herein, a red dichroic mirror would be used. In at least some embodiments, the interior mixing chamber walls are reflective. LED packages 304 in FIG. 3 are as before mounted on a circuit board 316, which includes traces (not shown) to provide power to the blue LEDs. Wires (not shown) also pass through the walls of light basket 306 to provide power to OLED 308. Heat sink 320 in this embodiment provides a mechanical mounting surface for circuit board 316 as well as cooling. It should be noted that a dichroic mirror could be included at another location within the lighting system, for example, close to or packaged with LED devices inside the mixing chamber.

Various color mixing schemes can be used to generate substantially white light using an embodiment of the invention. Phosphors can be selected based on the color they emit when energized, and both conventional LEDs and OLEDs are available, which emit various colors. It should also be noted that the solid state emitter or emitters inside the light basket of the present invention that emit light of a first color could also be organic LEDs whose light mixes with light of the second color from the OLED at the opening to the mixing chamber. In some embodiments, the OLED, when illuminated, emits light having dominant wavelength from 600 to 640 nm, or 605 to 630 nm, which in either case may be referred to as "red" light. The solid state emitters inside the light basket are or include LEDs which, when illuminated, emit light having a dominant wavelength from 435 to 490 nm, or 440 to 480 nm. The phosphor being used, whether packaged with LEDs or remotely located, when excited by impinging light, emits light having a dominant wavelength from 540 to 585 nm, or 560 to 580 nm. These combinations of lighting elements can be referred to as a "blue-shifted yellow plus red" (BSY+R) system. This is but one example of a combination of lighting elements and phosphor that can be used to create substantially white light with a color rendering index (CRI) at least as good as generated by relatively low CRI types of residential lighting. Embodiments of the invention can produce light with a CRI of at least 70, at least 80, at least 90, or at least 95. Further examples and details of mixing colors of light using solid state emitters and phosphor can be found in U.S. Pat. No. 7,213,940, which is incorporated herein by reference.

To further explain what is meant herein by "substantially white" light, the color of light can be indicated in a chromaticity diagram, such as the 1931 CIE Chromaticity Diagram. Such a diagram includes a blackbody locus of points, which indicates points in the color space for light that humans perceive as the same or close to natural sources of light. A good "white" light source is generally considered a source whose point in the color space falls within four MacAdam ellipses of any point in the blackbody locus of points. In some embodiments of the present invention, this distance can be achieved. However, if the point for the light from a luminaire according to embodiments of the invention falls within six MacAdam ellipses in some embodiments or ten MacAdam ellipses in some embodiments, such light would be considered substantially white light for purposes of this disclosure. Further discussion of CIE diagrams and the blackbody locus of points can be found in U.S. Pat. No. 7,768,192, which is incorporated herein by reference.

Figure 4A:
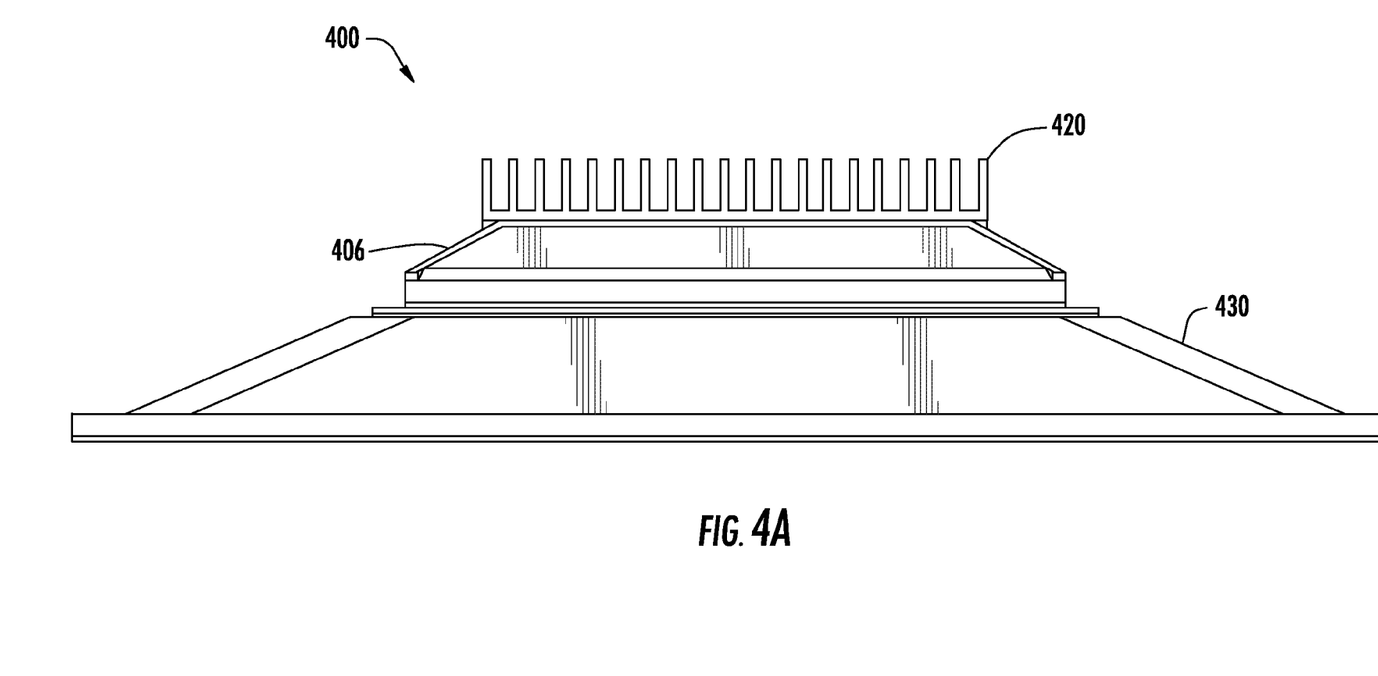
Figure 4B:
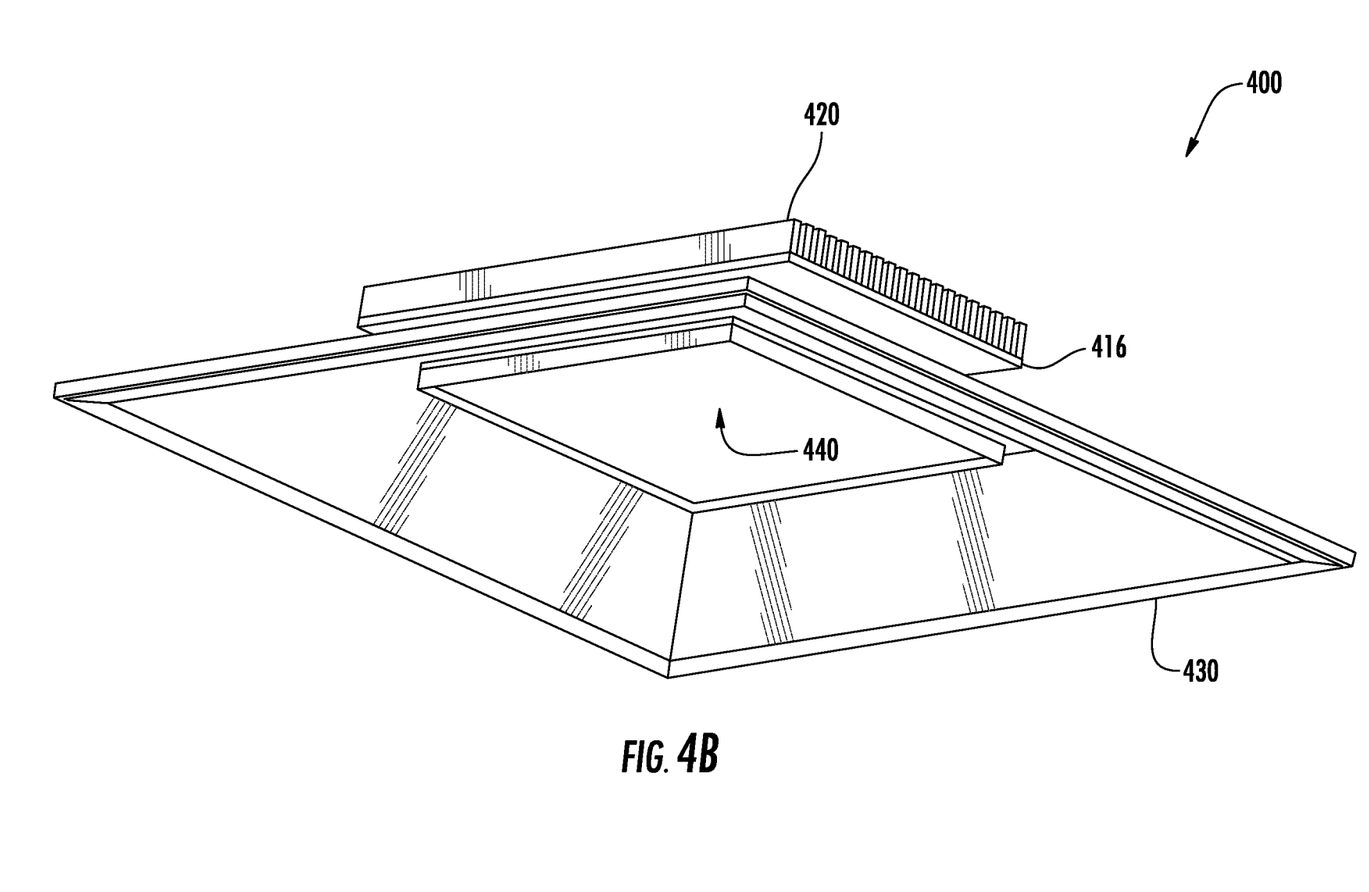

FIG. 4 illustrates an example luminaire making use of a lighting system like that described herein. This particular example luminaire is a troffer style fixture designed to be inserted in a drop ceiling of the type typically found in commercial office buildings. Again, this fixture is but one example of many types and styles of luminaries in which embodiments of the present invention might find use. FIG. 4 includes two views, and end view shown in FIG. 4A and a perspective view shown in FIG. 4B. Luminaire 400 includes the light basket 406, circuit board 416, heat sink 420, and baffle assembly 430. In some embodiments, the luminaire would also include a power supply and a junction box. The baffle assembly 430 has an overall dimension sized to fit in a conventional suspended ceiling grid system. For example, the overall dimension of the baffle assembly 430 may be 2' by 2'.

The light basket 406 of FIG. 4 includes a mixing chamber and solid sate emitters connected to circuit board 416 in the manner previously described. In some embodiments, the OLED could be exposed. In the embodiment of FIG. 4 an optical element 440 is included over the OLED to protect the OLED. The optical element could be clear, or could be frosted or similarly treated to provide additional light diffusion. The optical element may, for example, be provided as an acrylic, polycarbonate, PET, PETG or other light transmissive material.

Still referring to FIG. 4, it should be noted that the baffle assembly 430 recesses the light generation portion of the luminaire 400 above the plane of a ceiling tile. The light generation portion of the luminaire 400 is recessed above the ceiling tile such that a person occupying the illuminated space cannot directly see the "source" of light. However, recessing the light generation portion may also limit the ability of the luminaire to provide a wide distribution of light into the room. By providing a slanted baffle assembly 430, some light from the light basket may be incident on and illuminate the baffle assembly 430 to improve the overall appearance of luminaire 400.

Embodiments of the invention can use varied fastening methods and mechanisms for interconnecting the parts of the lighting system and luminaire. For example, in some embodiments locking tabs and holes can be used. In some embodiments, combinations of fasteners such as tabs, latches or other suitable fastening arrangements and combinations of fasteners can be used which would not require adhesives or screws. In other embodiments, adhesives, screws, bolts, or other fasteners may be used to fasten together the various components. The optical components and OLED in the opening to the mixing chamber of the light basket can be molded in place or fastened in place with an adhesive such as thermal epoxy. In some embodiments, a molded or formed lip near the opening of the mixing chamber can aid in holding the OLED, and/or mirror and/or diffuser in place.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A light fixture comprising:
a mixing chamber including an opening;
at least one LED within the mixing chamber of the light fixture configured to emit light of a first color when energized;
a substantially transparent substrate at the opening of the mixing chamber;
an organic light emitting diode (OLED) configured to emit light of a second color when energized, the OLED positioned on the substantially transparent substrate so that when the at least one LED and the OLED are energized at least the first and second colors of light mix before exiting the opening; and
phosphor adjacent to the substantially transparent substrate between the at least one LED and the OLED to provide wavelength conversion of a portion of the light of the first color so that the light fixture produces substantially white light with a color rendering index of at least 90.

2. The light fixture of claim 1 wherein the at least one LED and the phosphor are operable to emit blue-shifted yellow light and the OLED is operable to emit red light as the second color of light so that substantially white light is emitted from the light fixture.

3. The light fixture of claim 2 further comprising a diffuser adjacent to the substantially transparent substrate.

4. The light fixture of claim 3 wherein a point for the substantially white light falls within four McAdam ellipses of any point in a blackbody locus of points in a color space.

5. The light fixture of claim 1 further comprising a dichroic mirror between the substantially transparent substrate and the phosphor.

6. An LED fixture comprising:
a plurality of blue-emitting LEDs in a mixing chamber;
a substantially transparent substrate disposed at an opening of the mixing chamber of the LED fixture;
phosphor to form yellow light by wavelength conversion of a portion of the light from a blue-emitting LED; and
an organic LED (OLED) that, when energized, emits red light, the OLED on the substantially transparent substrate so that the red light and blue-shifted yellow (BSY) light mix to form substantially white light with a color rendering index of at least 90 emitted from the LED luminaire, and
wherein the phosphor is positioned adjacent to the substantially transparent substrate between the plurality of blue-emitting LEDs and the OLED.

7. The LED fixture of claim 6 wherein the light from the blue-emitting LEDs has a dominant wavelength from 435 to 490 nm, the light from the OLED has a dominant wavelength from 600 to 640 nm and the phosphor emits light having a dominant wavelength from 540 to 585 nm.

8. The LED fixture of claim 7 wherein the light from the blue-emitting LEDs has a dominant wavelength from 440 to 480 nm, the light from the OLED has a dominant wavelength from 605 to 630 nm and the phosphor emits light having a dominant wavelength from 560 to 580 nm.

9. The LED fixture of claim 6 further comprising a diffuser adjacent to the substantially transparent substrate.

10. The LED fixture of claim 6 further comprising a dichroic mirror between the phosphor and the substantially transparent substrate.

11. The LED fixture of claim 6 wherein a point for the substantially white light falls within four McAdam ellipses of any point in a blackbody locus of points in a color space.

12. A method of assembling a light fixture, the method comprising:
providing a plurality of LEDs configured to emit light of a first wavelength;
providing a mixing chamber with an opening that light from the plurality of LEDs passes through;
installing the transparent substrate with an organic LED (OLED) thereon configured to emit light of a second wavelength at the opening of the mixing chamber of the light fixture;
positioning a phosphor adjacent to the substantially transparent substrate between the LEDs and the OLED to provide wavelength conversion of a portion of the light from the LEDs;
connecting the mixing chamber to a heat sink; and
providing power connections to the plurality of LEDs and the OLED so that the light fixture is operable to produce substantially white light with a color rendering index of at least 90.

13. The method of claim 12 further comprising installing a diffuser at the opening of the mixing chamber.

14. The method of claim 13 further comprising installing a dichroic mirror at the opening of the mixing chamber.

* * * * *